(12) United States Patent
Watanabe et al.

(10) Patent No.: US 6,320,841 B1
(45) Date of Patent: Nov. 20, 2001

(54) SLIDER FOR OPTICAL HEAD

(75) Inventors: Kenjiro Watanabe, Tokyo; Shigeo Kubota; Hideo Owa, both of Kanagawa, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/409,048

(22) Filed: Sep. 30, 1999

(30) Foreign Application Priority Data

Oct. 7, 1998 (JP) .................................................. 10-285625

(51) Int. Cl.[7] .............................. G11B 7/12; G11B 7/135
(52) U.S. Cl. .............................. 369/300; 369/13; 369/112
(58) Field of Search .............................. 369/300, 13, 112; 360/114; 359/726, 727, 728, 730

(56) References Cited

U.S. PATENT DOCUMENTS

| | | | | |
|---|---|---|---|---|
| 5,508,981 | * | 4/1996 | Watanabe et al. | 369/13 |
| 5,617,378 | * | 4/1997 | Watanabe et al. | 369/13 |
| 5,715,226 | * | 2/1998 | Shimano et al. | 369/112 |
| 5,831,797 | * | 11/1998 | Schaenzer et al. | 360/114 |
| 5,886,959 | * | 3/1999 | Bischoff et al. | 369/13 |
| 5,970,038 | * | 10/1999 | Boutaghou et al. | 369/112 |
| 5,986,995 | * | 11/1999 | He et al. | 369/112 |
| 6,055,222 | * | 4/2000 | Knight | 369/112 |
| 6,091,694 | * | 7/2000 | Spath | 369/112 |
| 6,104,675 | * | 8/2000 | Hatam-Tabrizi | 369/13 |
| 6,130,779 | * | 10/2000 | Carlson et al. | 359/566 |
| 6,160,769 | * | 12/2000 | Ohnuki et al. | 369/13 |
| 6,181,485 | * | 1/2001 | He | 359/719 |

FOREIGN PATENT DOCUMENTS 0 951 013 A2 * 10/1999 (EP) .
99/27532 * 6/1999 (WO) .

* cited by examiner

*Primary Examiner*—William Klimowicz
(74) *Attorney, Agent, or Firm*—Ronald P. Kananen

(57) ABSTRACT

A slider for the optical head easy to manufacture and having a high degree of freedom is to be provided as a slider for the optical head for recording and/or reproducing a recording medium using the proximity optical field. On a slider member 3, adapted for running on the recording medium in a state of being floated over or contacted with the recording medium, a catadioptric lens 7 is bonded to constitute a slider for the optical head 1. The slider member 3 and the catadioptric lens 7 are connected and optically unified to each other so that the numerical aperture NA of an optical system made up of the slider member 3 and the catadioptric lens 7 is not less than unity. Also, the plane of the focal point of the light incident for the side of the catadioptric lens 7 is designed to be on a recording medium facing surface of the slider member 3.

20 Claims, 6 Drawing Sheets

SLIDER FOR OPTICAL HEAD

BACKGROUND OF THE INVENTION

1. Field of the Invention

This invention relates to a slider for an optical head used for recording and/or reproducing information signals for a recording medium by exploiting a proximity optical field.

2. Description of the Related Art

For realizing a higher recording density of a recording medium, such as an optical disc, a technique has been proposed in which the proximity optical field is utilized for recording/reproducing the recording medium. In this technique, the numerical aperture NA of the optical system adapted for collecting light on the recording medium in recording/reproduction is adapted to be not less than unity (1) by exploiting the proximity optical field. This renders it possible to raise the recording density of the recording medium.

FIG. 1 shows an illustrative slider for an optical head used in recording/reproduction by exploiting the proximity optical field.

A slider for an optical head 100 includes an optical system employing a so-called solid immersion lens. The slider for the optical head 100 includes a slider member 105, supported by a suspension 103, a first optical lens 107 and a second optical lens 109. Both the first and second optical lenses 107, 109 are mounted on the slider member 105. When a recording medium 111, such as an optical disc, is run in rotation, the slider member 105 is uplifted by an air stream flowing between the recording medium 111 and the slider member 106 so as to be floated over the recording medium 111.

Of the optical lenses, loaded on the slider member 105, the first optical lens 107 arranged on the light incident side, is of the numerical aperture NA=0.6, while the second optical lens 109, arranged on the recording medium 111, is a semi-spherical lens with the refractive index n=2. Thus, an optical system combined from the first optical lens 107 and the second optical lens 108, is of the numerical aperture NA=1.2, thus achieving the numerical aperture NA>1.

In recording/reproduction, the recording medium 111 is run in rotation to float the slider member 105 to maintain the interval of tens of a nm between the recording medium facing surface of the second optical lens 109 and the recording medium 111. The recording/reproducing light is caused to fall from the first optical lens 107 so as to be focussed on the recording medium facing surface of the second optical lens 109. At this time, evanescent light leaks from the recording medium facing surface of the second optical lens 109. This evanescent light, leaking from the recording medium facing surface of the second optical lens 109, is coupled to the recording medium 111. This evanescent light is used for recording/reproduction. Thus, with the numerical aperture NA>1, it becomes possible to use an extremely fine light spot to perform recording/reproduction.

Meanwhile, in order to perform recording/reproduction as described above, the interval between the recording medium facing surface of the second optical lens 109 and the recording medium 111 needs to be sufficiently small as compared to the light wavelength. Thus, in this slider for the optical head 100, the slider member 105 is used to enable the interval between the recording medium facing surface of the second optical lens 109 and the recording medium 111 to be maintained at a sufficiently small value. There are a large number of prior art techniques for floating the head a minor amount. The slider for the optical head 100 exploits this technique routinely used in the field of hard disc devices.

In the slider for the optical head 100, shown in FIG. 1, the optical axes and the relative distance of the first optical lens 107 and the second optical lens 109 need to be aligned accurately, thus raising the problem of manufacture difficulties.

Also, in the present slider for the optical head 100, the recording medium facing surface of the second optical lens 109 constitutes a so-called air bearing surface (ABS) along with the recording medium facing surface of the slider member 105. Thus, with the present slider for the optical head 100, it is necessary to load the second optical lens 109 on the slider member 105 and to grind the recording medium facing surfaces thereof. However, with the conventional slider for the optical head 100, the second optical lens 109 and the slider member 105 are formed of different materials, such that it is difficult to grind these members to form the desired ABS surface to a high accuracy.

The recording medium facing surface of the slider member 105 is formed with a pattern of irregularities in order to control the air stream flowing between the slider member 105 and the recording medium 111 to realize stable floating. However, with the slider for the optical head 100, since the second optical lens 109 is exposed to the recording medium facing surface, the degree of freedom in designing the pattern of irregularities is lowered.

If the recording medium 111 is a magneto-optical disc, a magnetic field is required in recording/reproduction, so that a magnetic coil needs to be arranged in the vicinity of the light focussing point. This magnetic coil needs to be arranged so that the light focussing point will be at the center of the magnetic coil, while the magnetic coil needs to be buried in the slider member 105 so as not to disturb the floating of the slider member 105. However, since the second optical lens 109 is exposed to the recording medium facing surface, limitations are imposed on the burying position to lower the degree of freedom in designing. Although it may be contemplated to bury the magnetic coil in the second optical lens 109, it is difficult to bury the magnetic coil in the optical lens, thus increasing the manufacturing cost.

Thus, in the slider for the optical head 100, the optical axes and the relative distance of the first optical lens 107 and the second optical lens 109 need to be aligned accurately, thus raising manufacture difficulties. Also, the ABS surface is difficult to machine accurately, while the degree of freedom in designing is low. Moreover, limitations are imposed on the arraying position of the magnetic coil to lower the freedom in designing.

SUMMARY OF THE INVENTION

It is therefore an object of the present invention to provide a slider for an optical head for recording/reproducing a recording medium by exploiting the proximity optical field in which manufacture is facilitated and the degree of freedom in designing is high.

According to the present invention, there is provided a slider for the optical head including a slider member for running on a recording medium during recording and/or reproduction for the recording medium in a state of being floated over or in a state of being contacted with the recording medium, and an optical lens connected to the slider member. The slider member is connected and optically unified to the optical lens so that the numerical aperture NA of an optical system made up of the slider member and the optical lens is not less than unity. The focal point plane of the light incident from a side of the optical lens is on a recording medium facing surface of the slider member.

At least the portion of the slider member on which falls the light incident from a side of the optical lens preferably has the refractive index not less than that of the optical lens. In the slider for the optical head, the slider member and the optical lens are connected to each other by bonding with an adhesive. The magnitude of the refractive index of the adhesive is preferably not less than the magnitude of the numerical aperture NA of an optical system comprised of the slider member and the optical lens. The optical head may be provided with a magnetic coil buried in the slider member for encircling the position of the focal pint of the light incident from the side of the optical lens. The optical lens used for the slider for the optical head is preferably a catadioptric lens.

In the present slider for the optical head, the slider member and the optical lens are connected to each other to constitute the optical system comprised of the slider member and the optical lens. Also, in the slider for the optical head, the plane of the focal point of the light incident from the side of the optical lens is on the recording medium facing surface of the slider member such that the optical lens is not exposed on the recording medium facing surface. Thus, in the present slider for the optical head, the slider member and the optical lens can be designed and manufactured independently so that the slider for the optical head is high in the degree of designing freedom and easy to manufacture.

Thus, in the present slider for the optical head, in which the slider member and the optical lens are connected and optically unified to each other to constitute an optical system, it has a high degree of freedom in designing and is easy to manufacture. Therefore, it is possible with the present invention to provide a slider for the optical head, improved in recording density by exploiting the proximity optical field, and thus suited for a recording medium having a high recording density, at a low cost, thus contributing to higher recording density of the recording medium.

DESCRIPTION OF THE PREFERRED EMBODIMENTS

Figure 1:
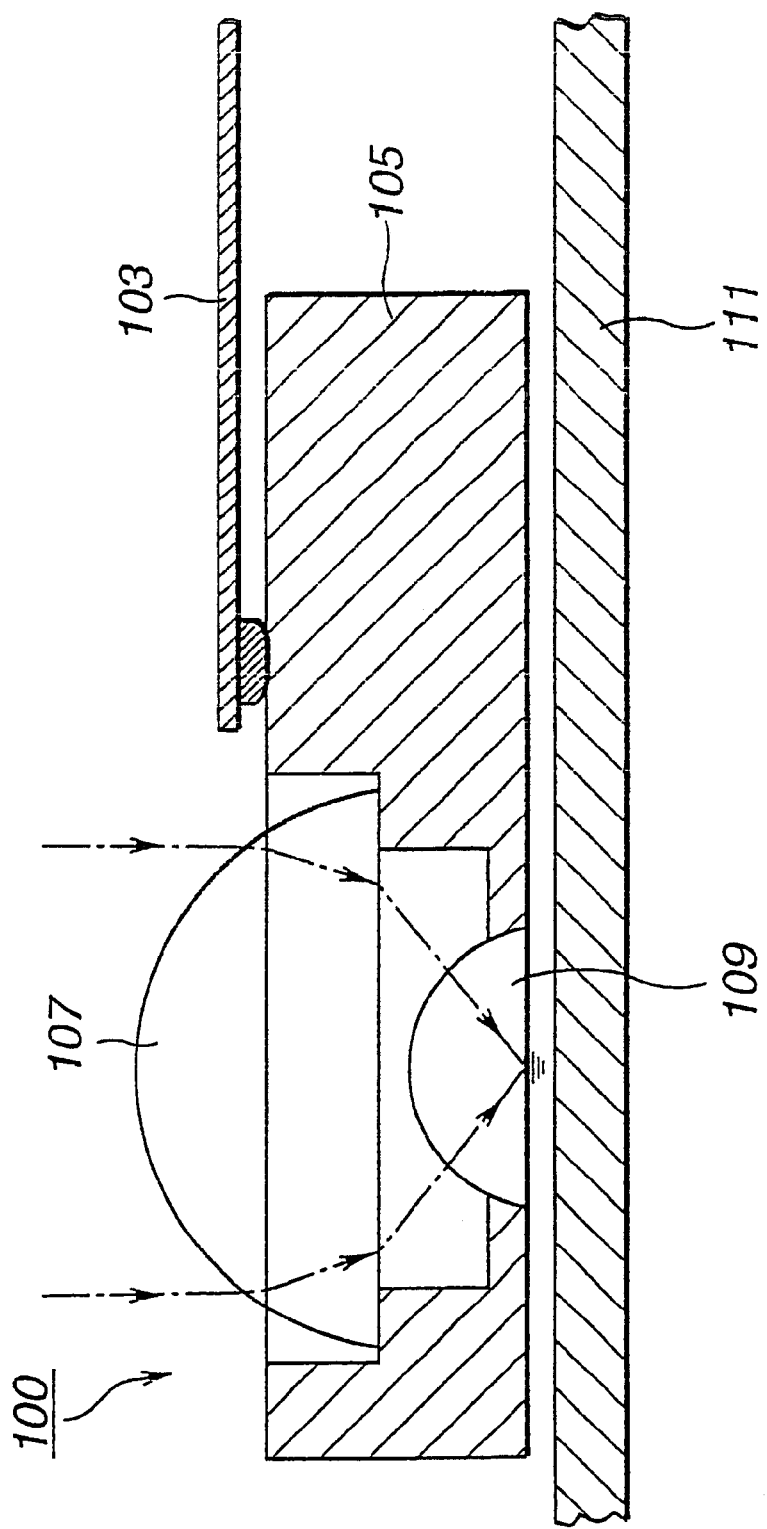
FIG. 1 shows a typical conventional slider for an optical head.

Referring to the drawings, preferred embodiments of the present invention will be explained in detail.

Figure 2:
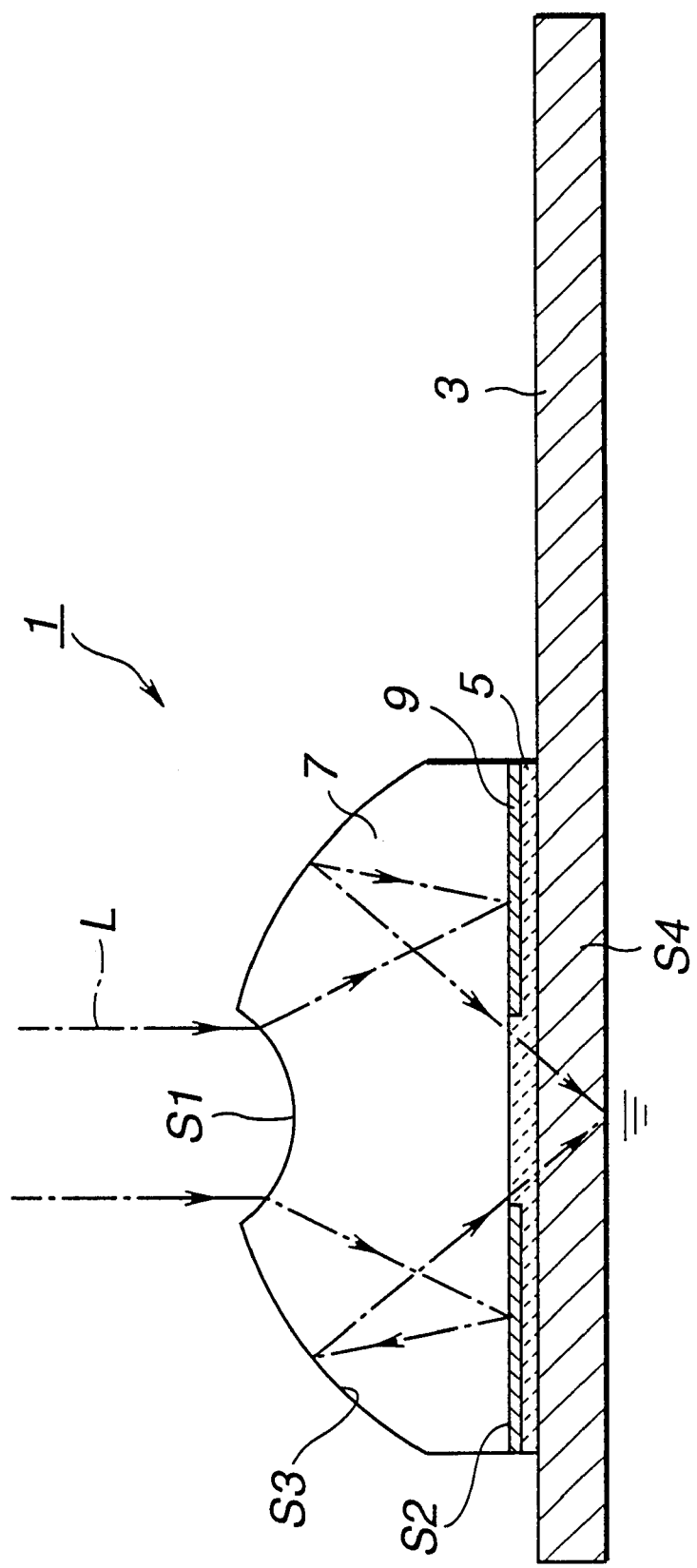
FIG. 2 shows atypical slider for an optical head embodying the present invention.

FIG. 2 shows an embodiment of a slider for an optical head 1 according to the present invention. This slider for the optical head 1 is used when recording/reproducing a recording medium by exploiting the proximity optical field and includes a slider member 3 and a catadioptric lens 7 bonded to the slider member 3 with an adhesive 5. A recording medium for recording/reproduction may be enumerated by an optical disc on which the information is previously recorded by embossed bits and a phase change optical disc which exploits phase changes of the recording layer to enable the information writing.

Similar to the head slider used in the hard disc drive, the slider member 3 is supported by a suspension on a recording medium, and is subjected to a lift by an air stream flowing between the recording medium and the slider member 3 in recording/reproduction for the recording medium so that the slider member 3 runs over the recording medium in a state of being floated a pre-set amount from the recording medium. However, in the present slider for the optical head 1, in distinction from the head slider used in the hard disc device, the light L used for recording/reproduction reaches the recording medium via the slider member 3. It is noted that at least the portion of the slider for the optical head 1 on which falls the light used for recording/reproduction is formed of a material having sufficiently high transmittance at least insofar as the wavelength area of the light used for recording/reproduction is concerned.

The catadioptric lens 7 is used for collecting the light L illuminated on the recording medium for recording/reproduction, and includes a first surface S1, comprised of a concave refractive surface, a second surface S2, comprised of a plane mirror S2 and a third surface S3 comprised of a concave reflecting surface. This catadioptric lens 7 is molded from a vitreous material having a refractive index of, for example, n=1.8. The second surface S2 is a mirror surface by forming a light reflective surface 9 comprised of an Al film and a SiN film. However, the mid portion of the second surface S2 is not formed with the light reflective surface 9 and is simply provided with an opening for light transmission.

In performing recording/reproduction for the recording medium, using the slider for the optical head 1, the recording medium is run in rotation to float the slider member 3 above the recording medium to maintain the interval of the order of 50 nm or less between the recording medium facing surface S4 of the slider member 3 and the recording medium. The light L illuminated on the recording medium for recording/reproduction is caused to fall on the first surface S1 of the catadioptric lens 7.

The incident light beam on the catadioptric lens 7 is enlarged by the first surface S1, comprised of the concave refractive surface, to fall on the second surface S2, comprised of the plane mirror. The light beam then is reflected by the second surface S2 to fall on the third surface S3 comprised of the concave non-spherical mirror. The light beam then is reflected by the third surface S3 and radiated from the catadioptric lens 7 via a mid opening formed in the second surface S2. The light radiated from the catadioptric lens 7 falls on the slider member 3 connected and unified to the catadioptric lens 7 to form a focus on the recording medium facing surface S4 of the slider member 3.

The focal plane of the light flux incident on the catadioptric lens 7 is the recording medium facing surface S4 of the slider member 3. This recording medium facing surface S4 is the ABS surface of this slider for the optical head 1. That is, the air stream flowing between the recording medium and the slider member 3 during recording/reproduction for the recording medium flows along the recording medium facing surface S4 of the slider member 3.

The light incident on the catadioptric lens 7 is collected on the recording medium facing surface S4 of the slider member 3, as described above. At this time, evanescent light leaks from the recording medium facing surface S4 of the slider member 3. This evanescent light is coupled to the recording medium because the interval between the recording medium facing surface S4 and the recording medium is maintained at approximately 50 nm or less. This evanescent light is used for recording/reproduction. Thus, with the numerical aperture NA>1, it becomes possible to use an extremely fine light spot to perform recording/reproduction. Specifically, the numerical aperture NA can be set to approximately 1.5 if, for example, the catadioptric lens 7 and the slider member 3 are formed of a vitreous material with the refractive index n=1.8.

The refractive index of the slider member 3 used for this slider for the optical head 1 is desirably not less than the refractive index of the catadioptric lens 7 at least insofar as the portion of the slider 3 on which falls the light radiated from the catadioptric lens 7 is concerned. By setting the refractive index of the slider member 3 so as to be not less than the refractive index of the catadioptric lens 7, it becomes possible to realize a larger value of the numerical aperture NA. Specifically, the slider member 3 and the catadioptric lens 7 are formed of the same vitreous material, with the refractive index n=1.8, as an example, as mentioned previously. This renders it possible to set the numerical aperture NA to approximately 1.5.

Also, in the slider for the optical head 1, the slider member 3 and the catadioptric lens 7 are bonded to each other by an adhesive 5. It is noted that, if the value of the refractive index of the adhesive 5 is smaller than the value of the numerical aperture NA of the optical system comprised of the slider member 3 and the catadioptric lens 7, total reflection occurs on the boundary of the adhesive layer. Thus, the value of the refractive index of the adhesive 5 is preferably not lower than the numerical aperture NA of the optical system comprised of the slider member 3 and the catadioptric lens 7.

Specifically, if the slider member 3 and the catadioptric lens 7 are formed of the same vitreous material having the refractive index n=1.8, and the numerical aperture NA is 1.5, such adhesive 5 used for bonding the slider member 3 and the catadioptric lens 7 together is used which has the refractive index not less than 1.5. This renders it possible to prevent the total reflection from occurring on the boundary surface of the adhesive layer 5.

In more detail, if, with the thickness of the slider member 3 of 298 $\mu$m and the refractive index n of 1.8, with the refractive index of the catadioptric lens 7 being 1.8, NA is equal to 1.38, it has been found empirically that a UV light curable type sulfur containing acrylic resin adhesive (Mercapto-ester), for example, though not limited thereto NOA-73 manufactured by Nortland Products Inc., preferably has the refractive index n=1.56 and the thickness of 0.3±0.1 $\mu$m.

Under the same conditions, it has also been found empirically that a visible light curable type vinyl monomer adhesive, such as, but not limited to, Optogrape HV-2, manufactured by Adel AG, preferably has the refractive index n=1.63 and the thickness of 0.6±0.2 $\mu$m.

Under the same conditions, it has also been found empirically that a UV light curable type acrylic resin adhesive, such as, but not limited to, #8397, manufactured by NTT Advanced Technology Inc., preferably has the refractive index n=1.67 and the thickness of approximately 1 $\mu$m.

The above-described slider for the optical head 1 can be manufactured easily, without requiring high alignment accuracy, because only the sole catadioptric lens 7 is used as an optical lens.

With this slider for the optical head 1, since the optical lens is not exposed on the ABS surface, while the ABS surface is constituted solely by the recording medium facing surface S4 of the slider member 3, it is only necessary to carry out the machining for the ABS surface for the slider member 3. Thus, with the present slider for the optical head 1, the machining necessary for the ABS surface needs only to be performed on the slider member 3 prior to bonding the head slider 3 to the catadioptric lens 7.

Specifically, the recording medium facing surface S4 needs to be polished to a mirror surface finish to assure sufficient surface planarity, while it needs to be formed with a pattern of irregularities to control the air stream flowing between the slider member 3 and the recording medium to realize stable floating.

Figure 3:
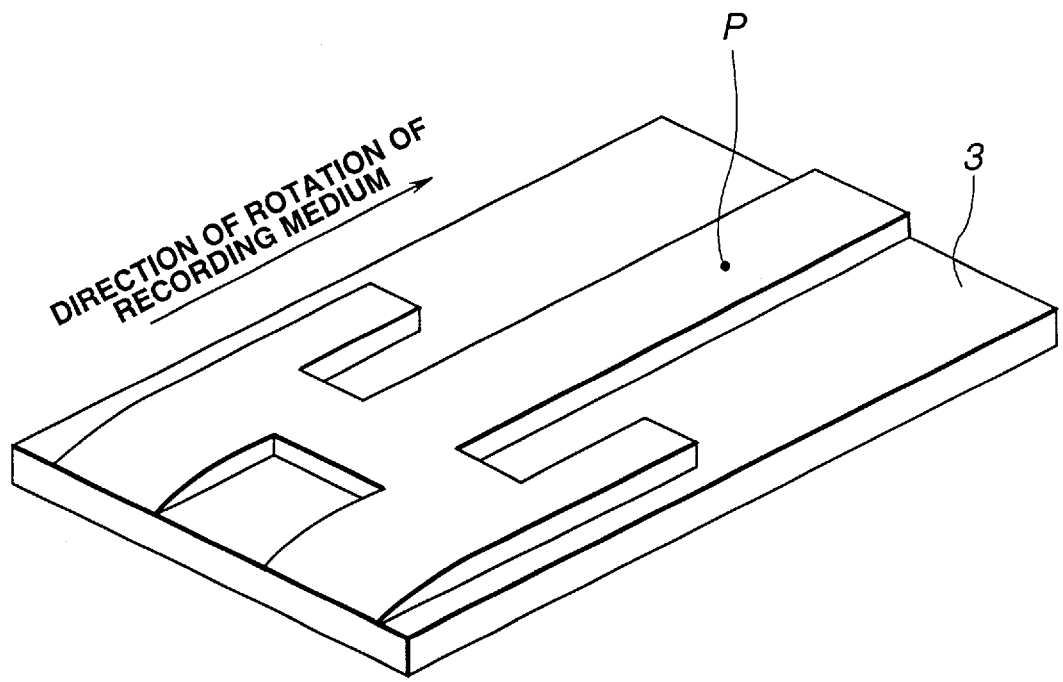
FIG. 3 is a perspective view of the slider member looking from the recording medium facing surface and showing an illustrative pattern of irregularities formed on an ABS surface of the slider member.

FIG. 3 shows an example of the pattern of irregularities formed on the recording medium facing surface S4 of the slider member 3. FIG. 3 shows, looking from the recording medium facing surface the slider member 3, the ABS surface of which carries the pattern of irregularities. In FIG. 3, a point P indicates the focal position of the light collected by the catadioptric lens 7.

With the above-described slider for the optical head 1, such machining for the ABS surface is executed at the outset before bonding the catadioptric lens 7 to the slider member 3. This enables the ABS surface to be machined easily to a high accuracy.

Moreover, with the present slider for the optical head 1, since the optical lens is not exposed on the ABS surface, while the ABS surface is constituted solely by the recording medium facing surface S4 of the slider member 3, the freedom in designing the pattern of irregularities to be formed on the ABS surface is improved significantly. That is, except the focal point of the light used for recording/reproduction, the ABS surface of the slider for the optical head 1 can be configured optionally without constraint from optical requirements. Therefore, with the present slider for the optical head 1, the air stream flowing between the slider member 3 and the recording medium can be controlled to realize an optimum pattern of irregularities on the ABS surface to assure stable floating without limitations from optical requirements.

Figure 4:
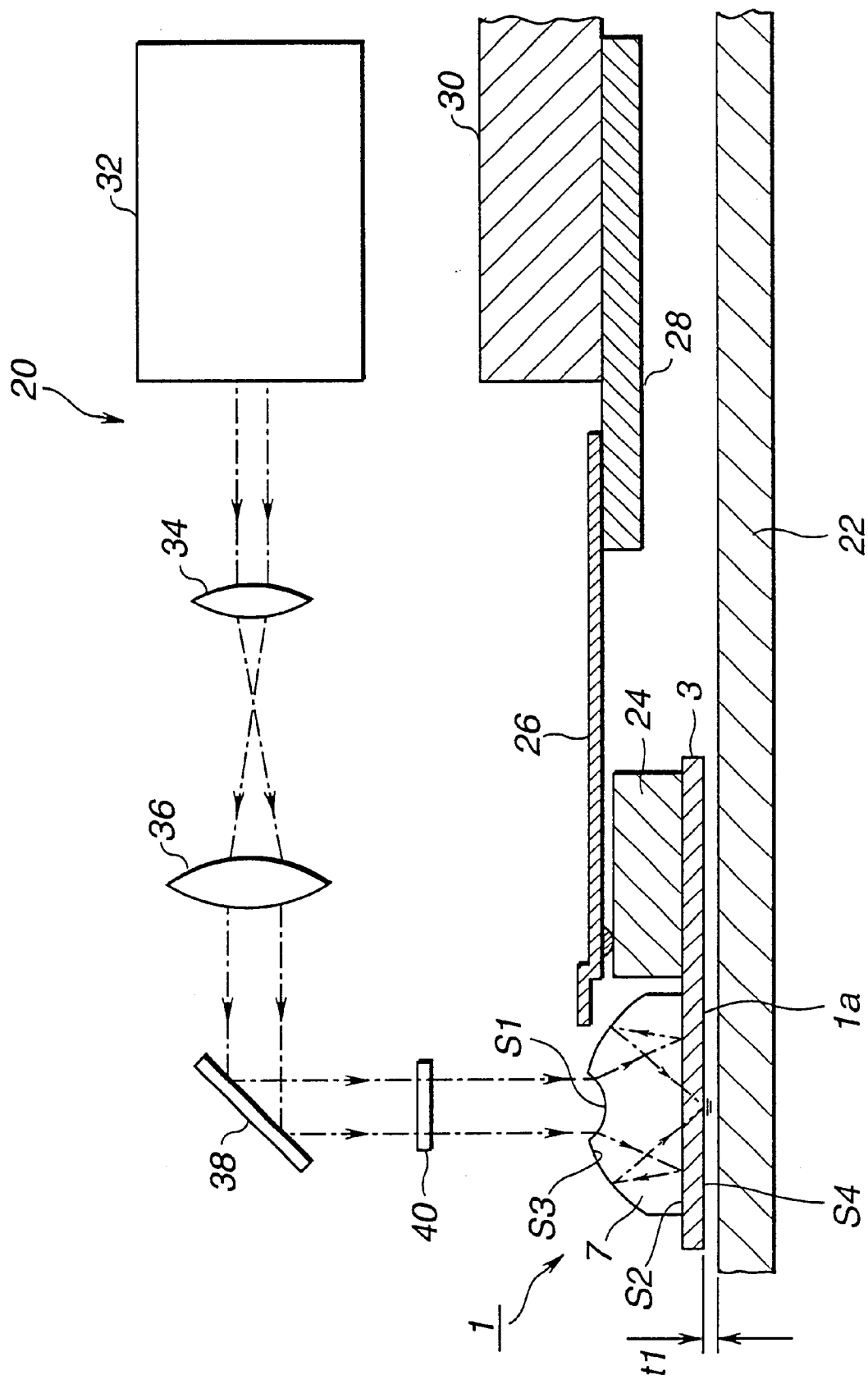
FIG. 4 shows an illustrative structure of the slider for the optical head of FIG. 2 assembled into a recording/reproducing apparatus.

Referring to FIG. 4, the recording/reproducing apparatus, having built therein the above-described slider for the optical head 1, is hereinafter explained.

A recording/reproducing apparatus 20, shown in FIG. 4, is designed to record/reproduce a disc-shaped recording medium 22, using the slider for the optical head 1. The slider for the optical head 1 has its slider member 3 set fixedly via supporting member 24 on a suspension 26 provided on the recording/reproducing apparatus 20. The suspension 26 is mounted via arm 28 on a translational stage 30 provided on the recording/reproducing apparatus 20. By this translational stage 30, the slider for the optical head 1 mounted on the suspension 26 is movable along the radius of the recording medium 22.

The recording/reproducing apparatus 20 also has a recording/reproducing optical system 32 for radiating the laser light with the wavelength $\alpha$=640 nm and for detecting the return light reflected back form the recording medium 22. In recording/reproduction, the recording/reproducing optical system 32 detects the return light from the recording medium 22 to generate signals required for recording/reproduction, such as tracking servo signals. Also, in reproduction, the recording/reproducing optical system 32 generates playback signals from the return light reflected back from the recording medium 22, whereas, in recording, the recording/reproducing optical system 32 modulates the intensity of the outgoing laser light in meeting with the recording signals to radiate the intensity-modulated laser light.

On the optical axis of the laser light, radiated from the recording/reproducing optical system 32, there are arranged a pair of lenses 34, 36 for setting the diameter of the laser light beam to a pre-set value, a light reflecting mirror 38 for reflecting the laser light, set to the pre-set diameter by the lenses 38, in the direction towards the slider for the optical head 1, and a quarter wave plate 40. The laser light radiated from the recording/reproducing optical system 32 in recording/reproduction is first set to a pre-set diameter to fall via the quarter wave plate 40 on the first surface S1 of the catadioptric lens 7 of the slider for the optical head 1.

The recording/reproducing optical system 32, lenses 34, 36, light reflecting mirror 38 and the quarter wave plate 40 are supported by a supporting plate, in a manner not shown, and are mounted on the translational stage 30. These components are moved by the translational stage 30 along with the slider for the optical head 1 mounted on the suspension 26.

In recording/reproduction for the recording medium by the above-described recording/reproducing apparatus 20, the recording medium 22 is run in rotation at a pre-set rpm, with an ABS surface 1a of the slider for the optical head 1 facing the recording medium 22. The slider for the optical head 1 is subjected to a lift, due to the air stream flowing between the ABS surface 1a of the slider for the optical head 1 and the recording medium 22, so that the slider for the optical head 1 is floated over the recording medium 22. It is noted that an amount of float $t_1$ of the slider for the optical head 1 is to be not larger than the wavelength of the laser light used for recording/reproduction. Specifically, the amount of float $t_1$ is on the order of 500 nm.

With the slider for the optical head 1 floated over the recording medium 22, the laser light is radiated from the recording/reproducing optical system 32. This laser light, set to a predetermined beam diameter by the lenses 34, 36, is reflected by the light reflecting mirror 38 to fall on the first surface S1 of the catadioptric lens 7 of the slider for the optical head 1.

The incident light beam, incident on the catadioptric lens 7, is first enlarged by the first surface S1, comprised of the concave refracting surface, to fall on a second surface S2, comprised of a planar mirror. The light beam, reflected by the second surface S2, falls on a third surface S3, comprised of a concave non-spherical mirror. The light beam reflected by the third surface S3 is radiated from the catadioptric lens 7 via an opening provided at the center of the second surface S2. The light radiated from the catadioptric lens 7 falls on the slider member 3, connected and optically unified to the catadioptric lens 7, so as to be focussed on the recording medium facing surface S4 of the slider member 3, that is on the ABS surface 1a.

At this time, evanescent light leaks out from the recording medium facing surface S4 of the slider member 3. Since the gap between the recording medium facing surface S4 of the slider member 3 and the recording medium 22, that is the amount of float $t_1$ of the slider for the optical head 1, is held at a magnitude not larger than approximately 50 nm, this evanescent light is coupled to the recording medium 22. This evanescent light is used to record/reproduce the recording medium 22. Thus, recording/reproduction can be realized using an extremely fine light spot, with the numerical aperture NA>1.

The light reaching the recording medium 22 as the evanescent light is reflected by the recording medium 22 and returned via slider member 3, catadioptric lens 7, quarter wave plate 40, light reflecting mirror 38 and the lenses 36, 34 to the recording/reproducing optical system 32. The recording/reproducing optical system 32 detects this return light to generate signals necessary for recording/reproduction, such as tracking servo signals. The recording/reproducing optical system 32 also generates playback signals from the return light reflected back form the recording medium 22.

It is noted that the slider for the optical head 1 is floated over the rotating recording medium 22 in recording/reproduction, as described above. The amount of float $t_1$ is varied depending on the rpm of the recording medium 22 or the load of the slider for the optical head 1. Since the proximity optical field is herein used, the amount of float $t_1$ of the slider for the optical head 1 is preferably as small as possible insofar as stable floating is assured.

Meanwhile, it is when the slider member 3 and the recording medium 22 are contacted with each other that the coupling between the evanescent light leaking from the recording medium facing surface S4 of the slider member 3 and the recording medium 22 becomes maximum. Therefore, if only optical conditions are taken into consideration, the slider member 3 of the slider for the optical head 1 may be kept in contact with the recording medium 22. If the recording/reproduction occurs as the slider member 3 is kept in contact with the recording medium 22, it becomes possible to make effective use of the power of the laser light used for recording/reproduction to the maximum extent possible. However, if the recording/reproduction is to be carried out with the slider member 3 kept in contact with the recording medium 22, it is necessary to set the design load of the slider for the optical head 1 to as small a value as possible to reduce the contact pressure between the slider for the optical head 1 and the recording medium 22 to a sufficiently small value.

Figure 5:
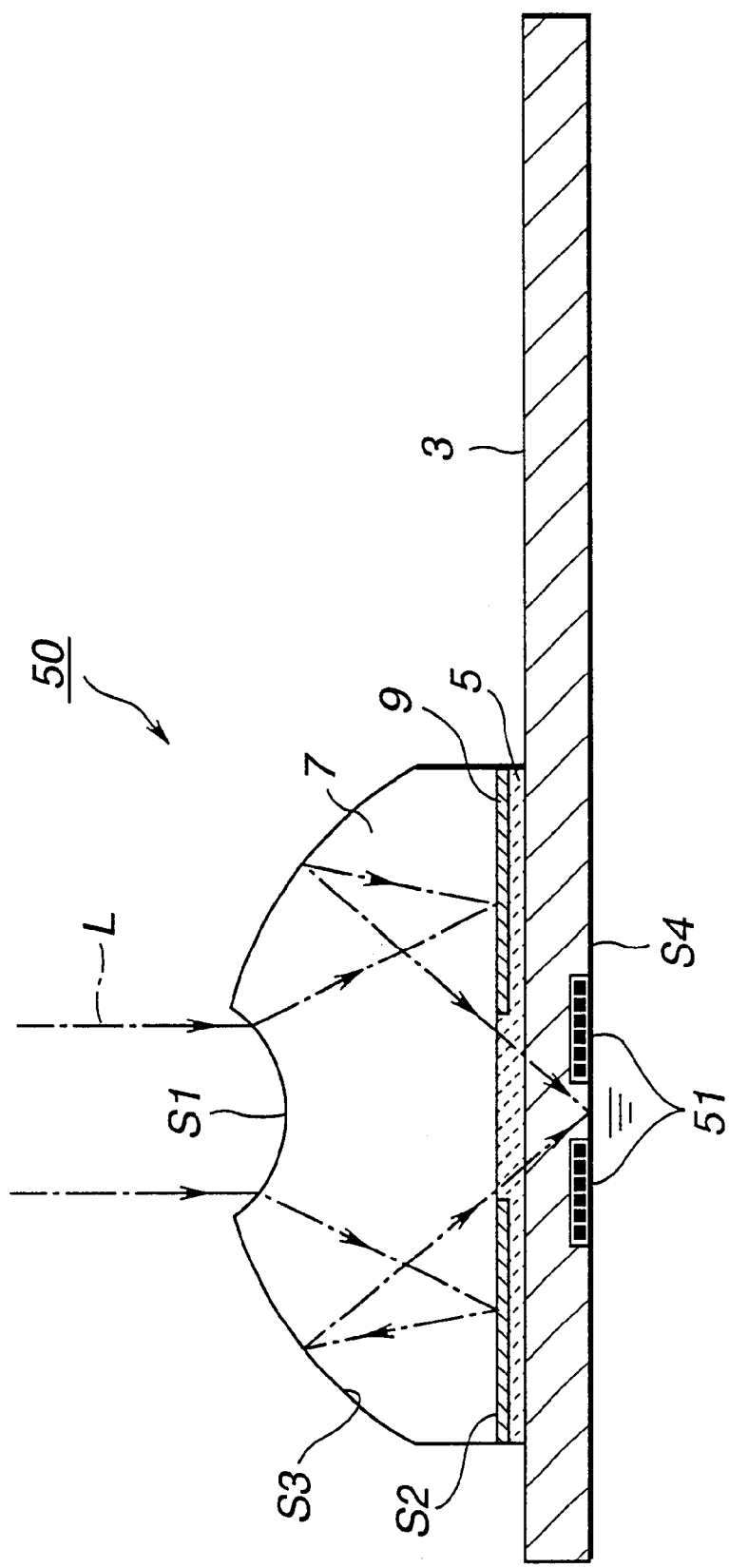
FIG. 5 shows another typical slider for an optical head embodying the present invention.

Referring to FIG. 5, a slider for the optical head carrying a magnetic coil is explained as another embodiment of the slider for the optical head according to the present invention.

A slider for the optical head 50, shown in FIG. 5, is used when a magneto-optical recording medium, such as a magneto-optical disc, is to be recorded or reproduced using the proximity optical field. It is noted that the slider for the optical head 50 is of a similar structure to that of the slider for the optical head 1 except that the slider for the optical head 50 is provided with a magnetic coil for magneto-optical recording 51. Thus, in the following description, the parts of components constructed similarly to those of the slider for the optical head 1 are denoted by the same reference numerals and are not explained specifically.

This magnetic coil 51 of the slider for the optical head 50 is buried in the slider member 3 for encircling the focal point of the light incident from the side of the catadioptric lens 7. At the center of the magnetic coil 51, the slider member 3 is left intact, such that the focal point of the light incident from the side of the catadioptric lens 7 is on the recording medium facing surface S4 of the slider member 3 and at the center position of the magnetic coil 51.

In producing the slider for the optical head 50, the magnetic coil 51, in the form of a thin sheet, is buried by, for example, the thin film process, in the recording medium facing surface S4 of the slider member 3, prior to connecting the catadioptric lens 7 to the slider member 3. After burying the magnetic coil 51 and forming the ABS surface in the slider member 3, the catadioptric lens 7 is connected to the slider member 3.

Thus, in the present slider for the optical head 50, the magnetic coil 51 is buried in the slider member 3 by a step different from the step of manufacturing the catadioptric lens 7. That is, with the present slider for the optical head 50, the magnetic coil 51 can be buried independently of the lens system. Therefore, the slider for the optical head 50 can be manufactured easily.

Moreover, with the present slider for the optical head 50, since the optical lens is not exposed on the ABS surface, while the ABS surface is constituted solely by the recording medium facing surface S4 of the slider member 3, the freedom in designing the magnetic coil 51 is improved significantly. That is, except the focal point of the light used for recording/reproduction, the ABS surface of the slider for the optical head 50 can be configured optionally without constraint from optical requirements. Thus, with the present slider for the optical head 50, the magnetic coil 51 optimum for magneto-optical recording can be arranged on the ABS surface without any substantial limitations from optical requirements.

It is noted that, if the slider for the optical head 50 is built into the recording/reproducing apparatus, it may be designed similarly to the configuration shown in FIG. 4. Since the recording is the magneto-optical recording if the slider for the optical head 50 is used, an optical system for magneto-optical recording is used as the recording/reproducing optical system 32. Also, in order to supply the current to the magnetic coil 51, the suspension 26 is fitted with a wiring, which is connected to a terminal of the magnetic coil 51 provided on the slider for the optical head 50. In magneto-optical disc recording, the magnetic coil 51 is fed with current via the wiring mounted on the suspension 26 to apply the recording magnetic field to the magneto-optical recording medium.

Figure 6:
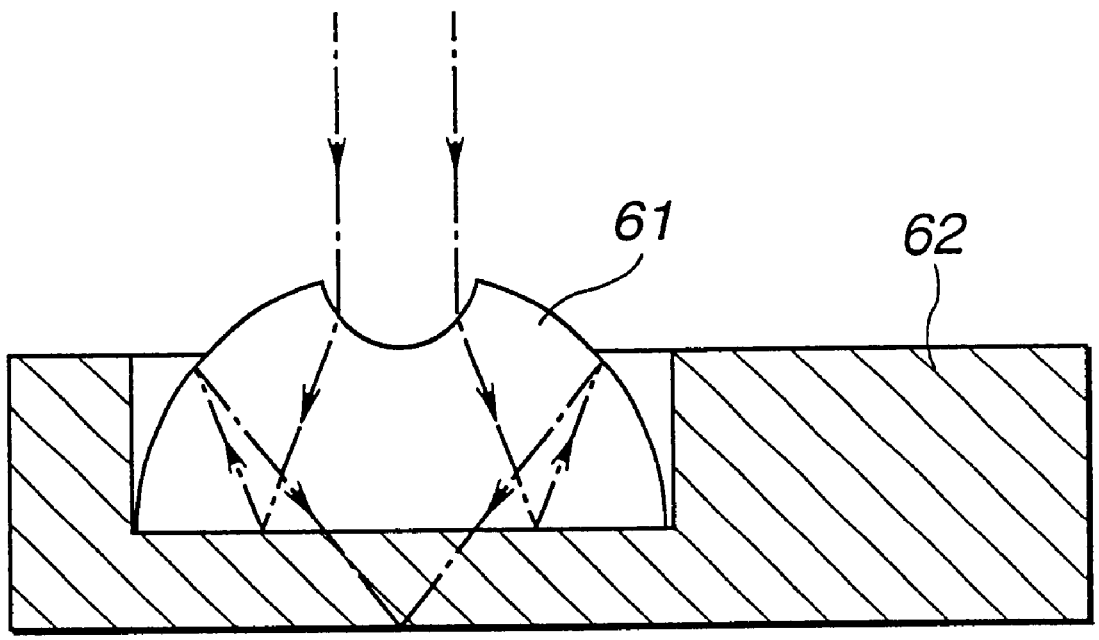
FIG. 6 shows yet another typical slider for an optical head embodying the present invention.

The slider member 3 or the catadioptric lens 7 is not limited as to their configuration to those used in the slider for the optical heads 1 or 50, it being only sufficient if these components are connected and unified optically to each other. Therefore, it is possible to use a catadioptric lens 61 of a smaller size to bury the catadioptric lens 61 in a slider member 62, as shown for example in FIG. 6.

What is claimed is:

1. A slider for an optical head comprising:
   a slider member for running on a recording medium during recording and/or reproduction for said recording medium in a state of being floated over or in a state of being contacted with said recording medium; and
   an optical lens coupled to said slider member;
   said slider member being coupled to and optically unified to said optical lens so that the numerical aperture (NA) of an optical system made up of said slider member and said optical lens is not less than unity;
   a focal point plane of light incident from a side of said optical lens being on a recording medium facing surface of said slider member.

2. The slider for the optical head according to claim 1, wherein a refractive index of at least a portion of the slider member on which falls the light from the side of said optical lens is not less than that of said optical lens.

3. The slider for the optical head according to claim 1, wherein the slider and the optical lens are coupled to each other by bonding with an adhesive, and wherein a magnitude of the refractive index of said adhesive is not less than the magnitude of the numerical aperture (NA) of an optical system comprised of said slider member and said optical lens.

4. The slider for the optical head according to claim 3, wherein the refractive index of said adhesive is 1.5 to 1.7.

5. The slider for the optical head according to claim 3, wherein said adhesive is a UV light curable acrylic acid adhesive, a UV light curable sulphur containing acrylic resin adhesive or a visible light curable type vinyl monomer adhesive.

6. The slider for the optical head according to claim 1, wherein said optical lens is a catadioptric lens.

7. A slider for an optical head comprising:
   a slider member for running on a recording medium, during recording and/or reproduction for the recording medium, in a state floated over the recording medium or in a state contacted with said recording medium;
   an optical lens coupled to said slider member; and
   a magnetic coil buried in said slider member for encircling a focal point position of light incident from a side of the optical lens;
   said slider member being coupled to and optically unified to said optical lens so that a numerical aperture (NA) of an optical system made up of said slider member and said optical lens is not less than unity;
   a focal point plane of the light incident from the side of said optical lens being on a recording medium facing surface of said slider member.

8. The slider for the optical head according to claim 7, wherein the refractive index of at least a portion of the slider member on which falls the light from the side of said optical lens is not less than that of said optical lens.

9. The slider for the optical head according to claim 7, wherein the slider and the optical lens are coupled to each other by bonding with an adhesive, and wherein a magnitude of the refractive index of said adhesive is not less than the magnitude of the numerical aperture (NA) of an optical system comprised of said slider member and said optical lens.

10. The slider for the optical head according to claim 9, wherein the refractive index of said adhesive is 1.5 to 1.7.

11. The slider for the optical head according to claim 9, wherein said adhesive is a UV light curable acrylic acid adhesive, a UV light curable sulphur containing acrylic resin adhesive or a visible light curable type vinyl monomer adhesive.

12. The slider for the optical head according to claim 7, wherein said optical lens is a catadioptric lens.

13. A catadioptric lens system comprising:
   a) an optical head lens having a surface defining a circular concave exterior body portion, said circular surface adapted to refract light; a second concave surface having an annular shape adapted to reflect light, said annular surface defining an internal body portion of said lens, wherein said circular surface is radially disposed within, and co-axially aligned with, said annular second surface;
   b) a first internal reflection surface defined by said annular concave surface, and a second internal reflection surface surrounding a focal point, wherein said second reflection surface faces said first reflection surface, and reflects refracted light from said circular concave surface toward said first reflection surface, wherein said first reflection surface in turn reflects said light toward said focal point; and c) a slider including a top and bottom surface wherein said top surface is bonded to said optical head lens, and wherein said bottom surface defines a recording medium facing surface; said slider further including a focal plane spaced from said circular concave surface, said focal plane including a focal point adapted to collect evanescent light passed through said first and second concave surfaces, wherein said focal point is positioned within said slider at said recording medium facing surface.

14. The catadioptric lens system of claim 13 further comprising a magnetic coil contained within said slider and positioned therein so as to encircle said focal point.

15. The catadioptric lens system according to claim 13, wherein a refractive index of at least a portion of the slider on which falls light from a side of said optical lens is not less than that of said optical lens.

16. The catadioptric lens system according to claim 13, wherein the slider and the optical lens are coupled to each other by bonding with an adhesive, and wherein a magnitude of the refractive index of said adhesive is not less than the magnitude of the numerical aperture (NA) of an optical system comprised of said slider and said optical lens.

17. The catadioptric lens system according to claim 14, wherein the refractive index of at least a portion of the slider on which falls the light from the side of said optical lens is not less than that of said optical lens.

18. The catadioptric lens system according to claim 16, wherein the refractive index of said adhesive is 1.5 to 1.7.

19. The catadioptric lens system according to claim 16, wherein said adhesive is UV light curable acrylic acid adhesive, a UV light curable sulphur containing acrylic resin adhesive or visible light curable type vinyl monomer adhesive.

20. The catadioptric lens system according to claim 13, wherein said slider further comprises a planar vitreous material between said top and bottom surfaces, and wherein said focal point is in said bottom surface.

* * * * *